(12) United States Patent
Echemendia et al.

(10) Patent No.: US 9,015,999 B1
(45) Date of Patent: Apr. 28, 2015

(54) TOWER WITH EXTERIOR CABLE SUPPORT AND A MODULAR BASE

(71) Applicants: Abel Echemendia, Lake Worth, FL (US); Abel J. Echemendia, Jr., Lake Worth, FL (US); Daniel S. Echemendia, Lake Worth, FL (US)

(72) Inventors: Abel Echemendia, Lake Worth, FL (US); Abel J. Echemendia, Jr., Lake Worth, FL (US); Daniel S. Echemendia, Lake Worth, FL (US)

( * ) Notice: Subject to any disclaimer, the term of this patent is extended or adjusted under 35 U.S.C. 154(b) by 0 days.

(21) Appl. No.: 14/452,562

(22) Filed: Aug. 6, 2014

Related U.S. Application Data (62) Division of application No. 14/093,547, filed on Dec. 2, 2013, now Pat. No. 8,919,051.

(51) Int. Cl.
    *E02D 27/00*     (2006.01)
    *E04H 12/20*     (2006.01)
    *E02D 27/42*     (2006.01)

(52) U.S. Cl.
    CPC ............... *E04H 12/20* (2013.01); *E02D 27/42* (2013.01)

(58) Field of Classification Search
    CPC ....... E02D 27/42; E02D 27/50; E02D 11/045; E02D 27/02; E02D 27/01; E04H 12/2261; E04H 12/24; E04H 12/34; E04H 12/2238; E04H 12/00; E04H 12/347; E04H 12/22; F16M 2200/08; Y01S 248/91
See application file for complete search history.

(56) References Cited

U.S. PATENT DOCUMENTS

| | | | | |
|---|---|---|---|---|
| 902,448 | A * | 10/1908 | Preacher | 52/292 |
| 3,691,776 | A * | 9/1972 | Hull | 405/232 |
| 4,972,642 | A * | 11/1990 | Strobl, Jr. | 52/297 |
| 7,942,612 | B1 * | 5/2011 | Willison | 405/244 |
| 8,499,513 | B2 | 8/2013 | Jolly | |
| 2004/0226236 | A1 * | 11/2004 | Pidgeon | 52/236.2 |
| 2006/0022188 | A1 * | 2/2006 | Collins | 256/65.14 |
| 2007/0181767 | A1 * | 8/2007 | Wobben | 248/346.01 |
| 2009/0158680 | A1 * | 6/2009 | Jolly | 52/292 |
| 2011/0061321 | A1 * | 3/2011 | Phuly | 52/297 |
| 2012/0047830 | A1 * | 3/2012 | Phuly | 52/294 |
| 2013/0139453 | A1 * | 6/2013 | Jolly | 52/173.1 |
| 2013/0291454 | A1 * | 11/2013 | Jolly | 52/169.13 |
| 2013/0326970 | A1 * | 12/2013 | Prass | 52/169.1 |

* cited by examiner

*Primary Examiner* — Brian Glessner
*Assistant Examiner* — Gisele Ford
(74) *Attorney, Agent, or Firm* — Donald J. Ersler (57) ABSTRACT

A tower with exterior cable support preferably includes a tower structure, a base plate, a middle support structure, a top plate and at least three cables. The tower structure may be a tapered monopole tower, a step mono tower or a lattice tower. The base plate is attached to a base of the tower. The middle support structure is attached to substantially a midway height of the tower. The top plate is secured to substantially a top of the tower. One end of the at least three cables are secured to the base plate, a perimeter of the at least three cables are supported by the middle support structure and the other end of the at least three cables are secured to the top plate. The modular base preferably includes at least four foundation base members, a tower base member, a perimeter wall base and at least four wall members.

17 Claims, 12 Drawing Sheets

TOWER WITH EXTERIOR CABLE SUPPORT AND A MODULAR BASE

CROSS-REFERENCES TO RELATED APPLICATIONS

This is a divisional application of nonprovisional application Ser. No. 14/093,547 filed on Dec. 2, 2013.

BACKGROUND OF THE INVENTION

1. Field of the Invention

The present invention relates generally to elevated structures and more specifically to a tower with exterior cable support and a modular base, which reduces the cost of construction.

2. Discussion of the Prior Art

Towers for windmills require a large base for support. Typical construction utilizes pouring concrete into a form to create the base. However, pouring concrete in a remote area can make transport of the concrete in concrete mixers very difficult. Providing a modular base will enable the base to be transported to the site in pieces and thus reduce the cost of base construction. U.S. Pat. No. 8,499,513 to Jolly discloses a tower foundation. The largest expense of a windmill is the tower. Reducing the cost of the tower will reduce the cost of the windmill. Providing a tower with exterior cable support will enable a mass of the tower structure to be reduced. Thus enabling the material costs of the tower to be lowered. Further, the exterior cable support of the tower will reduce sway, increase rigidity and reduce vibration.

Accordingly, there is a clearly felt need in the art for a tower with exterior cable support and a modular base, which reduces the cost of construction by providing a modular base and a tower that includes reduced mass, reduced vibration, improved rigidity and reduced sway.

SUMMARY OF THE INVENTION

The present invention provides a tower with exterior cable support and a modular base, which reduces the cost of construction. The tower with exterior cable support preferably includes a tower structure, a base plate, a middle support structure, a top plate, at least three cables and at least three spring tensioners. The tower structure may be a tapered monopole tower, a step mono tower or a lattice tower. The base plate is attached to a base of the tower. The middle support structure is attached to substantially a midway height of the tower. The top plate is secured to substantially a top of the tower. One end of the at least three spring tensioners are secured to the base plate. The other end of the at least three spring tensioners are secured to one end of the at least three cables. The at least middle support structure includes at least three projection tips, which are sized to receive a cross section of the cable. The other end of the at least three cables are retained by the top plate. The at least three spring tensions are adjusted to tension the at least three cables.

The modular base preferably includes a foundation base member, a tower base member, a perimeter wall base and at least four wall members. The foundation base member preferably includes two female base sections and two male base sections, which are assembled to each other. The tower base member is placed in a center of the four foundation base member. The perimeter wall base is placed on top of a perimeter of the foundation base member. One end of the four wall members are slipped into wall grooves formed in the tower base member and the other end of the four wall members are slipped into wall grooves formed in an inner perimeter of the perimeter wall base. Preferably, assembly hardware is used to secure the tower base member, the perimeter wall base and the at least four wall members to the foundation base member.

Accordingly, it is an object of the present invention to provide a tower with exterior cable support, which reduces the cost of construction by providing a tower that includes reduced mass, reduced vibration, improved rigidity and reduced sway.

Finally, it is another object of the present invention to provide a modular base, which does not require concrete to be cast.

These and additional objects, advantages, features and benefits of the present invention will become apparent from the following specification.

DETAILED DESCRIPTION OF THE PREFERRED EMBODIMENTS

Figure 1:
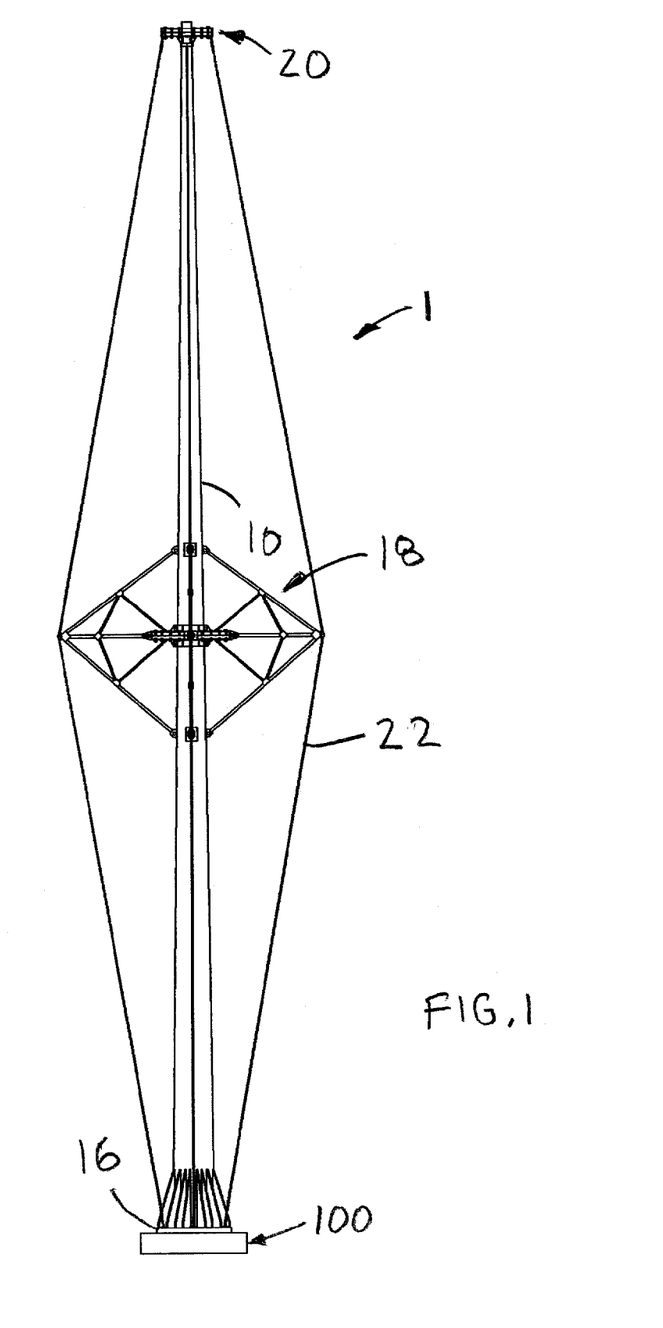
FIG. 1 is a front view of a tapered tower with exterior cable support in accordance with the present invention.
Figure 2:
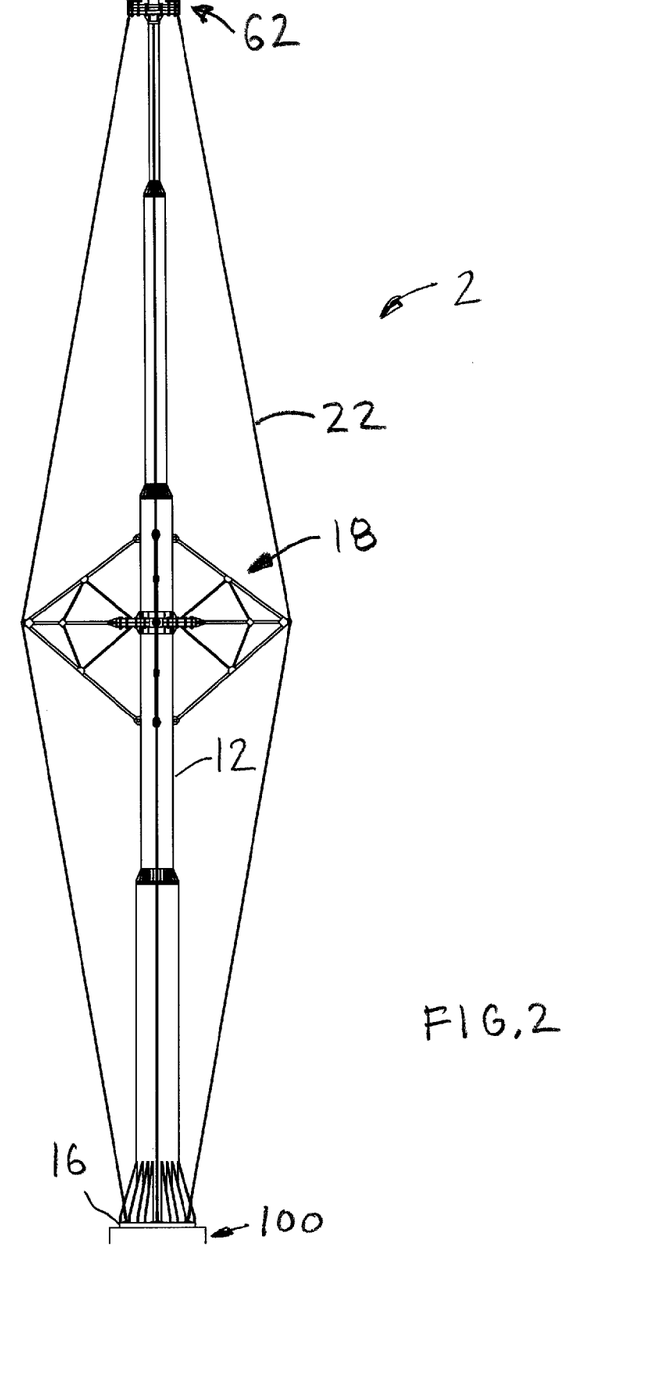
FIG. 2 is a front view of a step tower with exterior cable support in accordance with the present invention.
Figure 3:
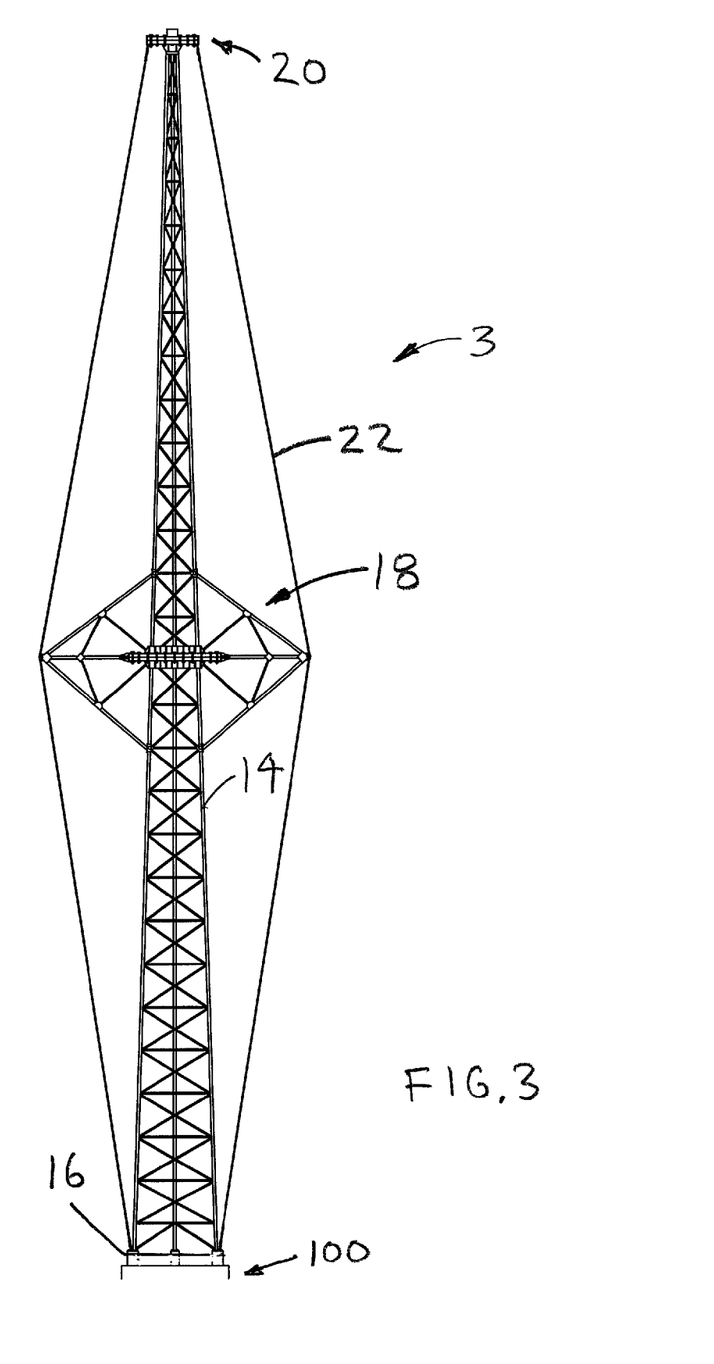
FIG. 3 is a front view of a lattice tower with exterior cable support in accordance with the present invention.
Figure 4:
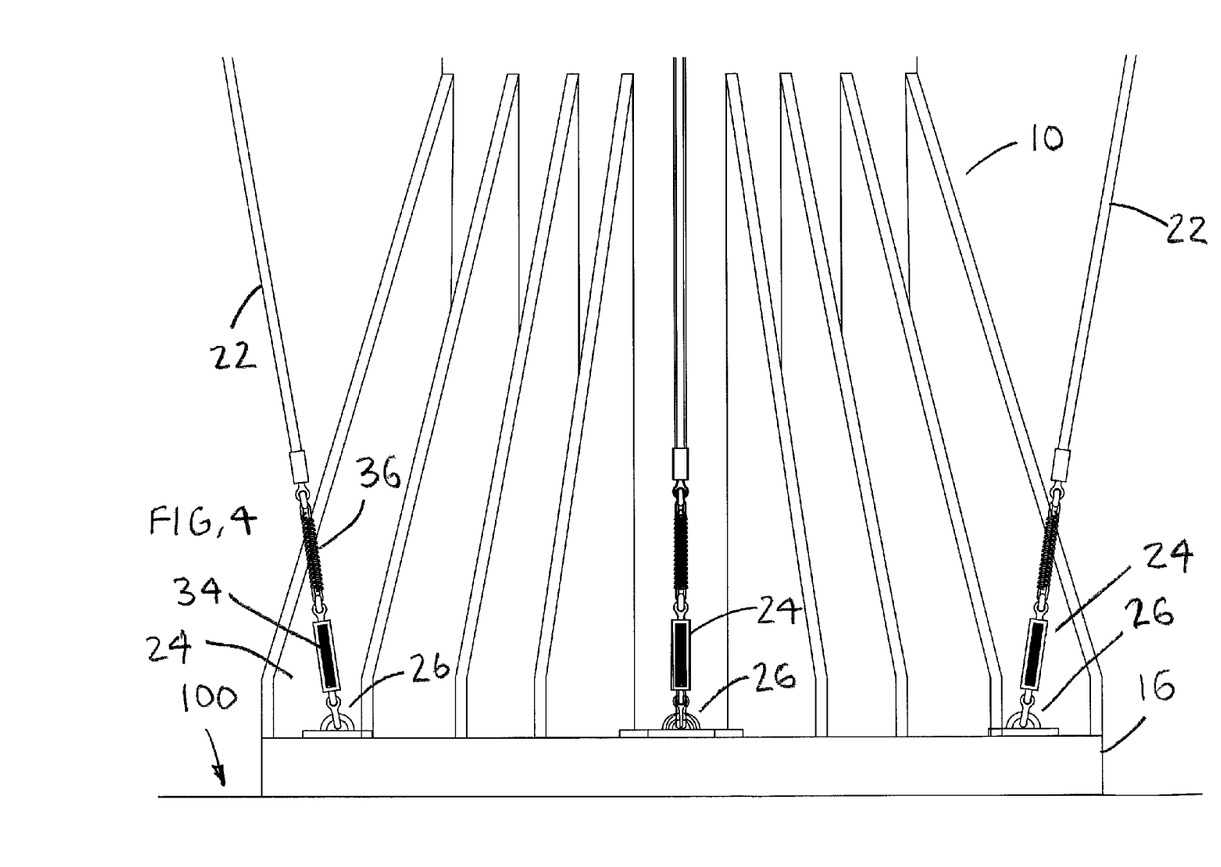
FIG. 4 is a front view of a bottom plate of a tapered tower with exterior cable support in accordance with the present invention.

With reference now to the drawings, and particularly to FIG. 1, there is shown a front view of a tapered tower with exterior cable support 1. FIG. 2 shows a step tower with exterior cable support 2. FIG. 3 shows a step tower with exterior cable support 3. The tower with exterior cable support 1,2,3 may be incorporated into new tower structures or retrofited to existing towers structures. With reference to FIG. 4, the tower with exterior cable support 1,2,3 preferably include a tower structure 10,12,14, a base plate 16, a middle support structure 18, a top plate 20, at least three cables 22 and at least three spring tensioners 24. The tower structure may be the tapered monopole tower 10, the step mono tower 12 or the lattice tower 14. The base plate 16 is attached to a modular tower base 100 of the tower 10,12,14 with any suitable method. The base plate 16 includes at least three anchor loops 26.

Figure 5:
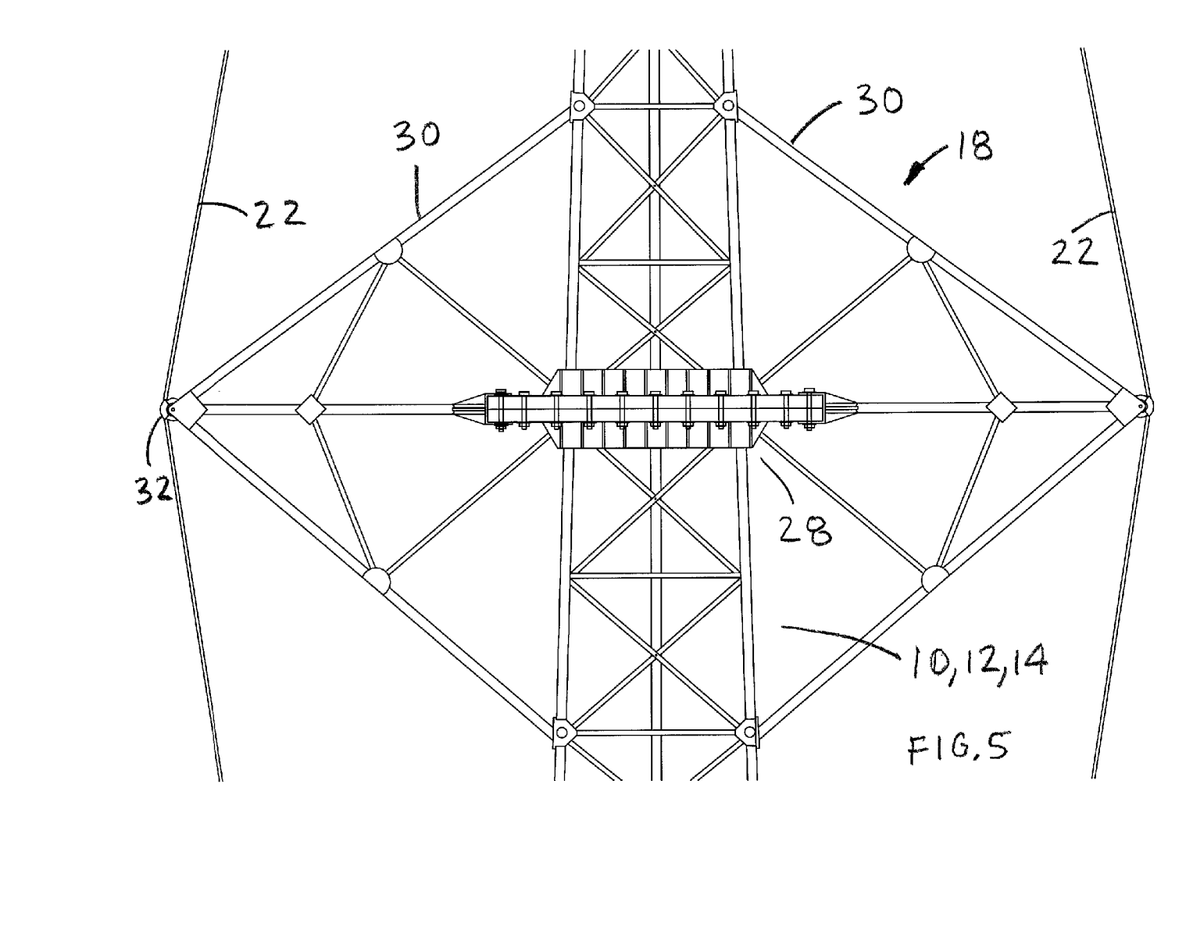
FIG. 5 is a front view of a middle support structure of a tapered tower with exterior cable support in accordance with the present invention.

With reference to FIG. 5, the middle support structure 18 is attached to substantially a midway height of the tower 10,12, 14. The middle support structure 18 preferably includes a tower clamping base 28 and at least three lateral supports 30. The clamping base 28 is attached to a perimeter of the tower 10,12,14. The clamping base 28 may have any suitable construction. Each lateral support 30 is attached to the clamping base 28 and the tower 10,12,14. The lateral support 30 may have any suitable construction. A cable seat 32 extends from a tip of the lateral support 30. The cable seat 32 is sized to receive a cross section of the cable 22.

Figure 6:
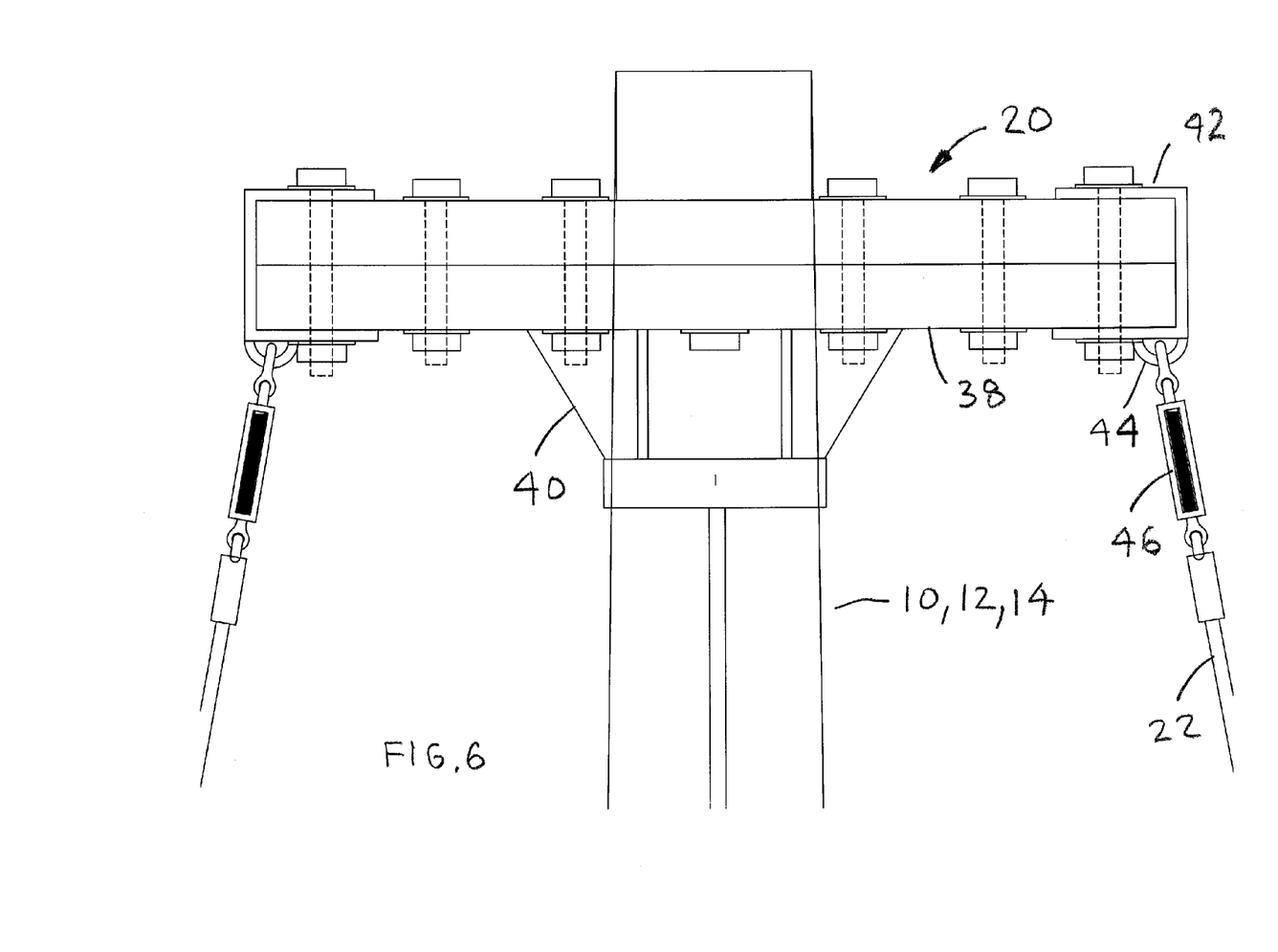
FIG. 6 is a front view of a solid top plate of a tapered tower with exterior cable support in accordance with the present invention.

With reference to FIG. 4, the spring tensioner 24 includes an adjustment portion 34 and a spring portion 36. One end of the adjustment portion 34 is attached to the anchor loop 26 and the other end is retained on one end of the spring portion 36. The other end of the spring portion 36 is secured to one end of the cable 22. With reference to FIG. 6, the top plate 20 is secured to substantially a top of the tower 10,12,14. The top plate 20 preferably includes a base plate 38, a clamp bracket 40 and at least three loop brackets 42. The clamp bracket 40 extends from the base plate 38. The clamp bracket 40 may have any suitable design. Each loop bracket 42 includes a cable loop 44. One end of a tensioner 46 is attached to the cable loop 44 and the other end of the tensioner 46 is secured to the other end of the cable 22.

Figure 7:
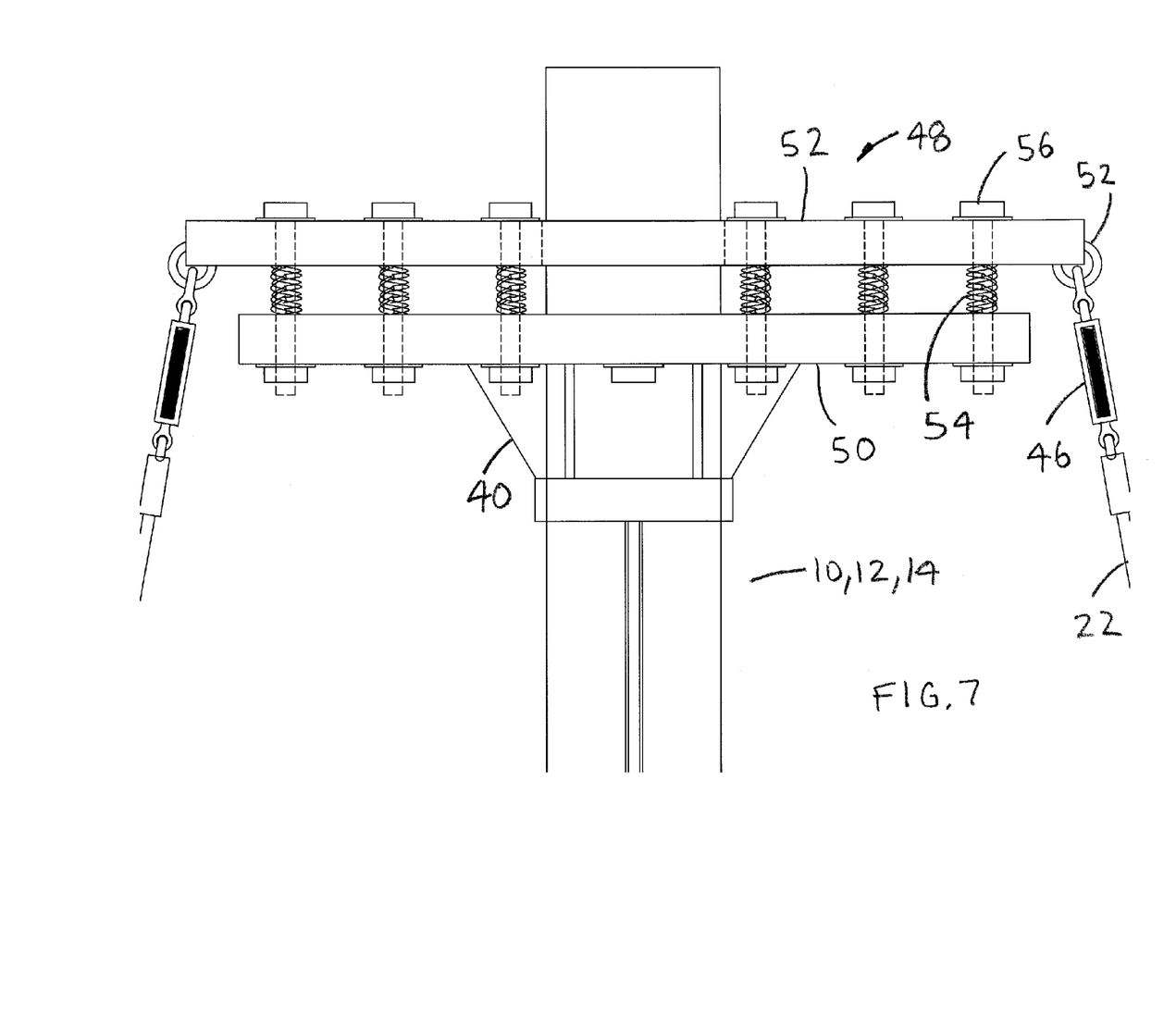
FIG. 7 is a front view of a spring loaded top plate of a tapered tower with exterior cable support in accordance with the present invention.
Figure 8:
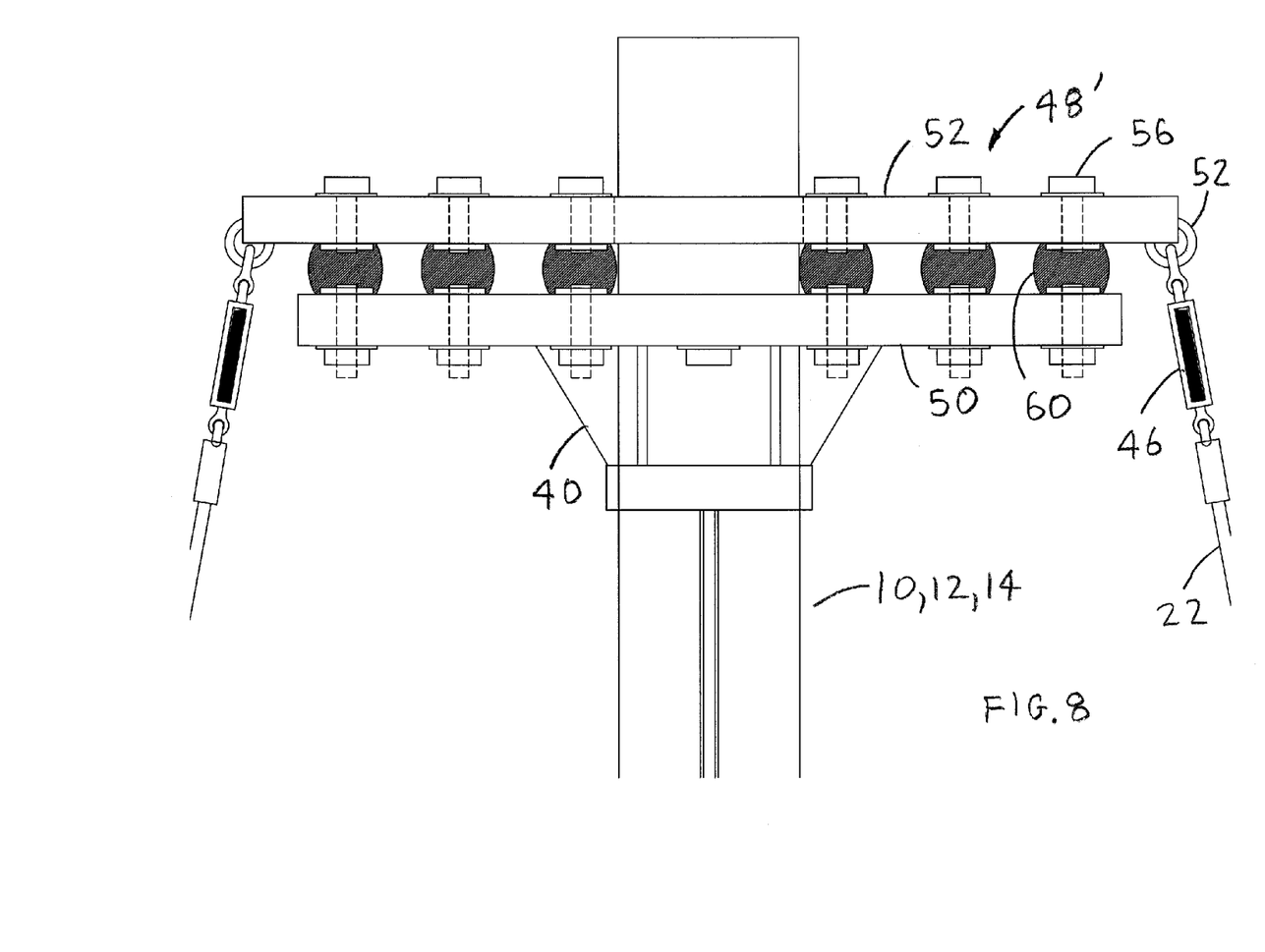
FIG. 8 is a front view of a rubber loaded top plate of a tapered tower with exterior cable support in accordance with the present invention.

With reference to FIG. 7, a spring loaded top plate 48 is secured to substantially a top of the tower 10,12,14. The top plate 48 preferably includes a base plate 50, a cable plate 52, a plurality of compression springs 54, a plurality of fasteners 56 and the clamp bracket 40. The base plate 50 is biased away from the cable plate 52 with the plurality of compression springs 54. A windmill generator (not shown) is mounted to the cable plate 52 to isolate the tower 10,12,14 from the vibration of the windmill generator. The plurality of fasteners 56 retain the base plate 50 relative to the cable plate 52. A plurality of cable rings 58 are disposed on a perimeter of the cable plate 52. With reference to FIG. 8, a spring loaded top plate 48' includes the replacement of the plurality of compression springs 54 with a plurality of rubber springs 60.

Figure 9:
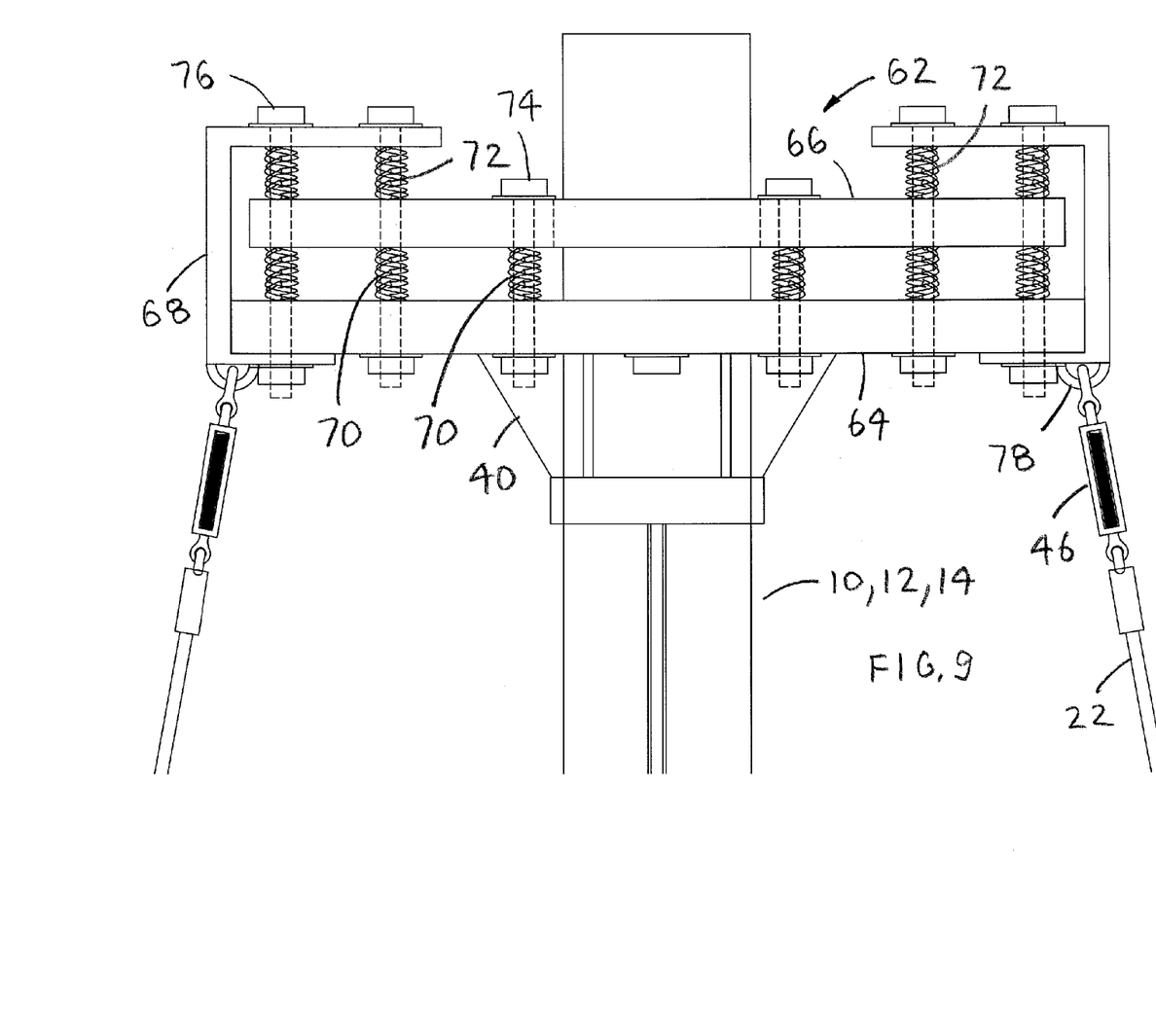
FIG. 9 is a front view of a complex spring loaded top plate of a tapered tower with exterior cable support in accordance with the present invention.
Figure 10:
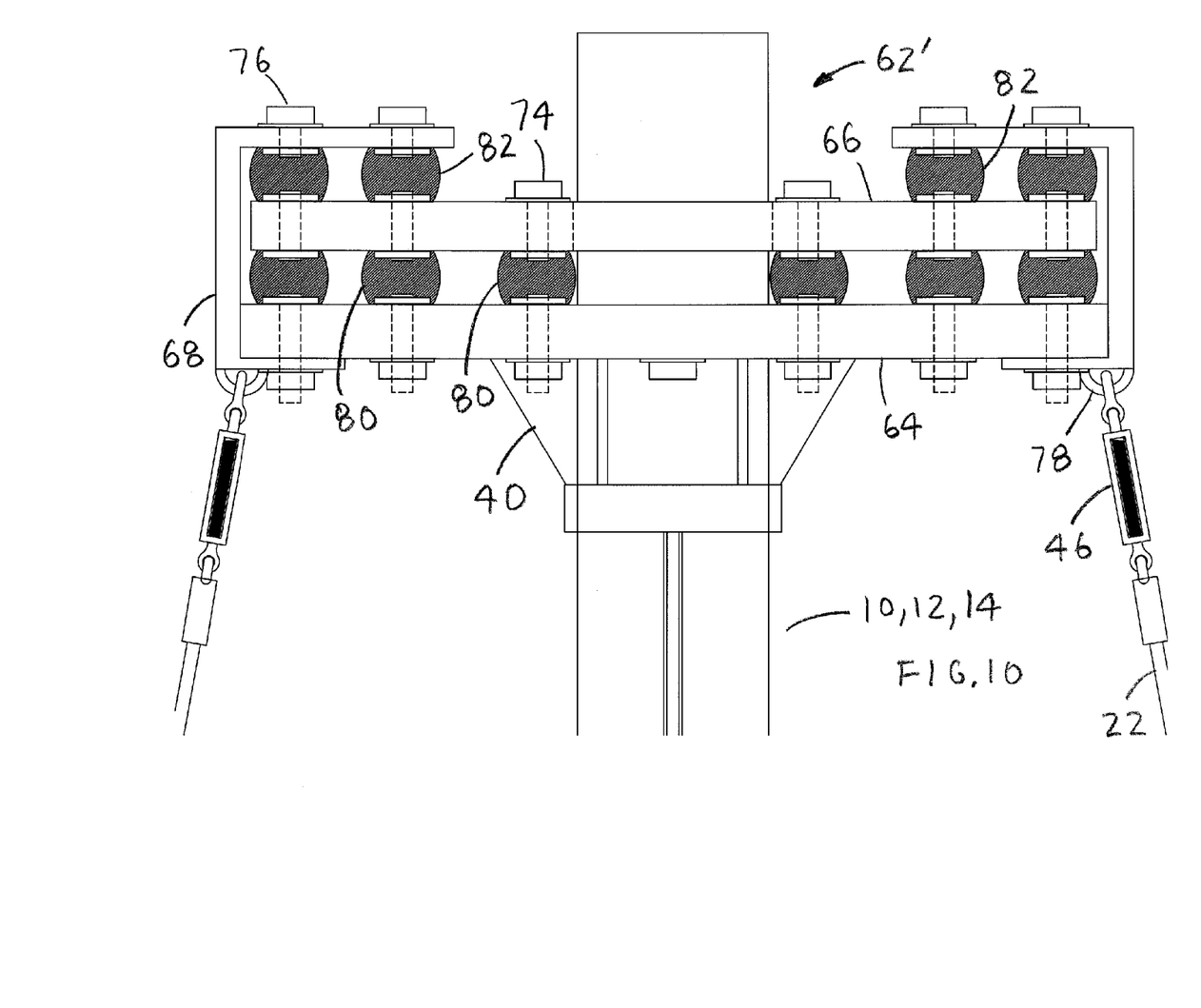
FIG. 10 is a front view of a complex rubber loaded top plate of a tapered tower with exterior cable support in accordance with the present invention.

With reference to FIG. 9, a complex spring loaded top plate 62 is secured to substantially a top of the tower 10,12,14. The complex spring loaded top plate 62 preferably includes a base plate 64, a support plate 66, at least three cable brackets 68, a plurality of compression springs 70, 72, a plurality of fasteners 74, 76 and the clamp bracket 40. The base plate 64 is biased away from the support plate 66 with the plurality of compression springs 70. A windmill generator (not shown) is mounted to the support plate 66 to isolate the tower 10,12,14 from the vibration of the windmill generator. The plurality of fasteners 74, 76 retain the base plate 64 relative to the cable plate 66. The at least three cable brackets 68 are biased away from the support plate 66 with the plurality of compression springs 72. A cable ring 78 extends from a bottom of the cable bracket 68. With reference to FIG. 10, a complex spring loaded top plate 62' includes the replacement of the plurality of compression springs 70, 72 with a plurality of rubber springs 80, 82.

Figure 11:
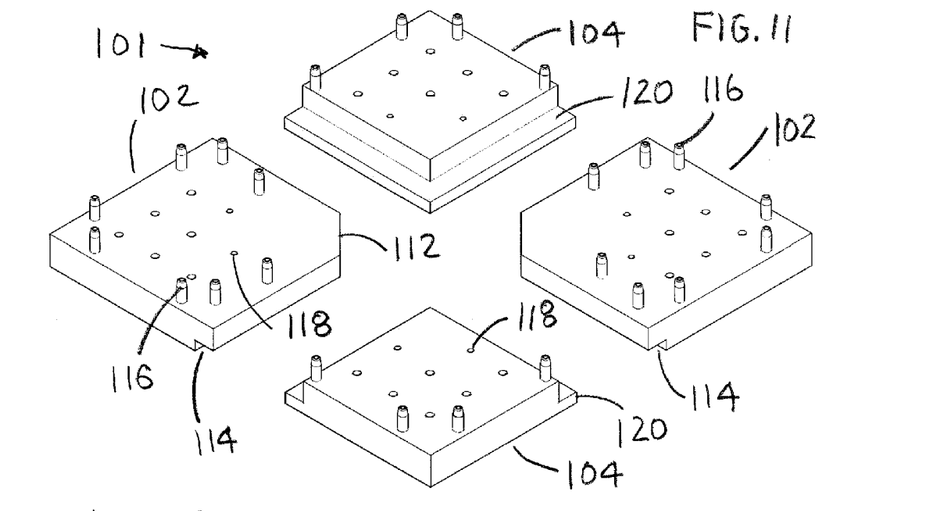
FIG. 11 is perspective view of an exploded foundation base member of a modular tower base in accordance with the present invention.
Figure 12:
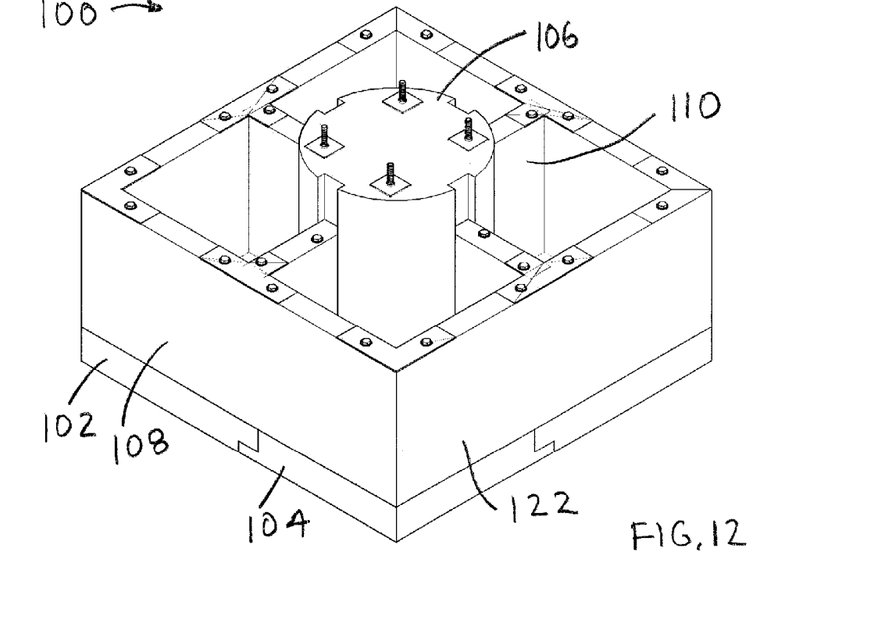
FIG. 12 is a perspective view of a modular tower base in accordance with the present invention.
Figure 13:
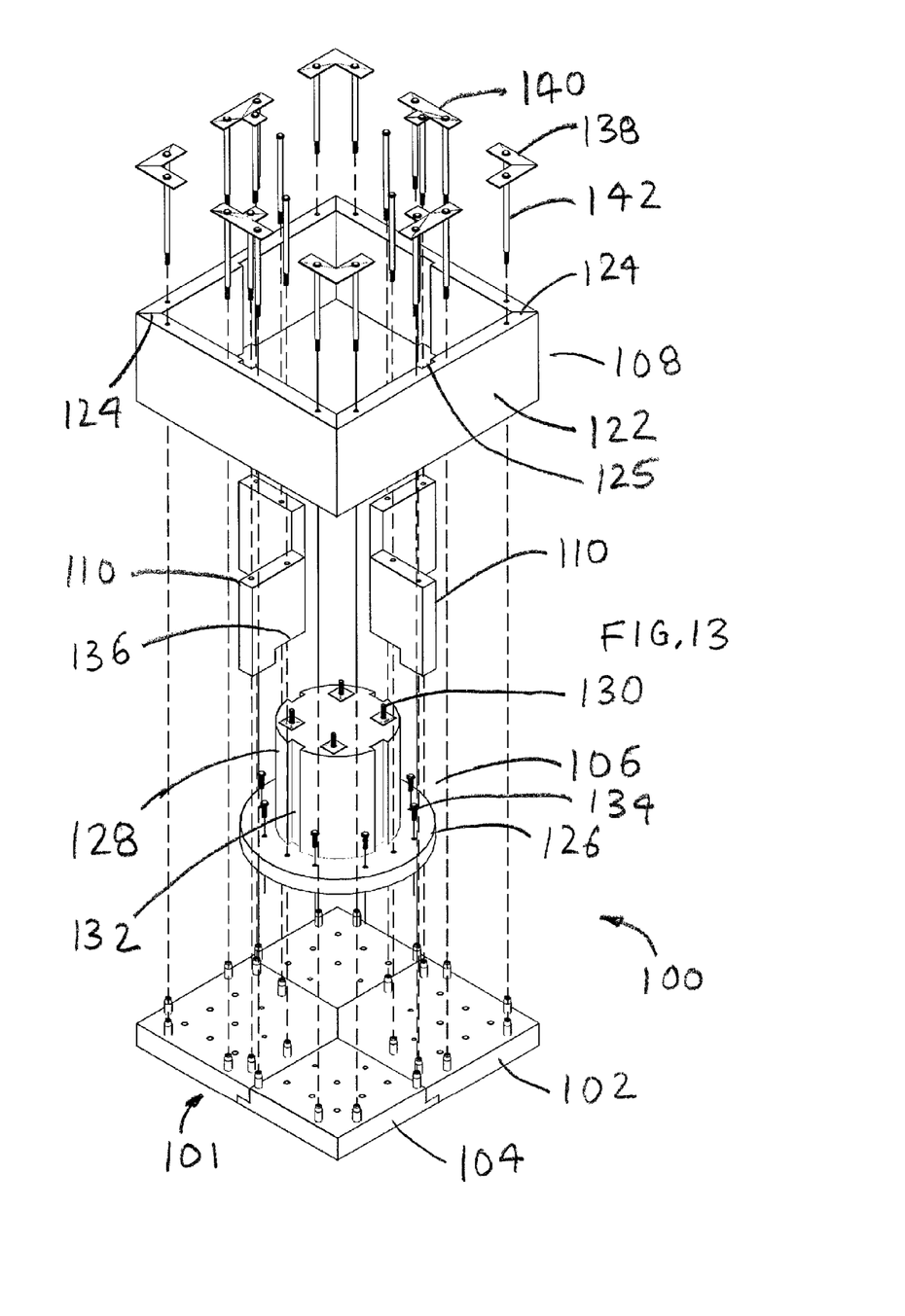
FIG. 13 is a partially exploded perspective view of a modular tower base in accordance with the present invention.

With reference to FIGS. 11-13, the modular tower base 100 preferably includes a foundation base member 101, a tower base member 106, a perimeter wall base 108 and at least four wall members 110. The foundation base member 101 preferably includes two female base sections 102 and two male base sections 104. The female base section 102 includes a chamfered edge 112, two side undercuts 114, a plurality of location pins 116 and a plurality of thread taps 118. The plurality of location pins 116 extend from a top of the foundation base section 102. The male base section 104 includes the plurality of location pins 116, the plurality of thread taps 118 and two side ledges 120. The plurality of location pins 116 extend from a top of the male base section 104. The side ledge 120 is sized to be received by the undercut 114.

The perimeter wall base 108 includes four wall sections 122. Each wall section is terminated with a chamfer 124 on each end thereof. A wall groove 125 is formed a middle of the wall section 122 to receive an end of the wall member 110. The tower base member 106 includes a base plate 126, a base cylinder 128 and a plurality of threaded studs 130. The base cylinder 128 extends from a top of the base plate 126. The plurality of threaded studs 130 extend from a top of the base cylinder 128. Four wall grooves 132 are formed in a perimeter of the base cylinder 128 to receive an opposing end of the wall member 110.

The tower base member 106 is secured to a center of the foundation base member 101 with a plurality of fasteners 134. Each wall member 110 includes an undercut 136, which is sized to receive the base plate 126. The perimeter wall base 108 is placed on top of a perimeter of the foundation base member 101. The four wall members 110 are slipped into the grooves 125 and 132. The perimeter wall base 108 and the four wall members 110 are secured to the foundation base member 101 with a plurality of L-brackets 138, a plurality of T-brackets 140 and a plurality of fasteners 142.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A modular base for a tower with exterior cable support comprising:
   a foundation base member includes two female base sections and two male base sections, each one of said two female base sections includes two side ledges extending from two sides thereof, said two side ledges are perpendicular to each other, each one of said two male base sections includes two undercuts formed in two sides thereof, said two undercuts are perpendicular to each other, wherein one of said two undercuts receives one of said two ledges;
   a tower base member is attached to substantially a center of said foundation base member;
   a perimeter wall base is attached to a perimeter of said foundation base; and
   at least three wall members are retained between said tower base and an inner perimeter of said perimeter wall base.

2. The modular base for a tower with exterior cable support of claim 1 wherein:
   a plurality of location pins extend upward from said two female base sections and said two male base sections.

3. The modular base for a tower with exterior cable support of claim 1 wherein:
   said perimeter wall base includes four wall sections.

4. The modular base for a tower with exterior cable support of claim 1 wherein:
   said perimeter wall base and said at least three wall members are secured to said foundation base member with a plurality of brackets and a plurality of fasteners.

5. The modular base for a tower with exterior cable support of claim 1 wherein:
said tower base member includes a base plate and a base cylinder extending upward from said base plate.

6. The modular base for a tower with exterior cable support of claim 5 wherein:
four wall grooves are formed in a perimeter of said base cylinder to receive one end of said four wall members, four wall grooves are formed in a middle of said four wall sections to receive an opposing end of said four wall members.

7. A modular base for a tower with exterior cable support comprising:
a foundation base;
a tower base member is attached to substantially a center of said foundation base member, said tower base includes base member includes a base plate and a base cylinder extending upward from said base plate;
a perimeter wall base is attached to a perimeter of said foundation base; and
at least three wall members are retained between said tower base and an inner perimeter of said perimeter wall base, each one of said at least three wall members includes an undercut, said undercut mates with said base plate, a bottom of each one of said at least three wall members is supported by said foundation base and said base plate.

8. The modular base for a tower with exterior cable support of claim 7 wherein:
said foundation base member includes two female base sections and two male base sections which interlock with each other.

9. The modular base for a tower with exterior cable support of claim 8 wherein:
a plurality of location pins extend upward from said two female base sections and said two male base sections.

10. The modular base for a tower with exterior cable support of claim 7 wherein:
said perimeter wall base includes four wall sections.

11. The modular base for a tower with exterior cable support of claim 7 wherein:
said perimeter wall base and said at least three wall members are secured to said foundation base member with a plurality of brackets and a plurality of fasteners.

12. The modular base for a tower with exterior cable support of claim 10 wherein:
four wall grooves are formed in a perimeter of said base cylinder to receive one end of said four wall members, four wall grooves are formed in a middle of said four wall sections to receive an opposing end of said four wall members.

13. A modular base for a tower with exterior cable support comprising:
a foundation base;
a tower base member is attached to substantially a center of said foundation base member, said tower base member includes a base plate and a base cylinder extending upward from said base plate;
a perimeter wall base is attached to an outer perimeter of said foundation base; and
at least four wall members are retained between said base cylinder and an inner perimeter of said perimeter wall base, four wall grooves are formed in said perimeter of said base cylinder to receive one end of said at least four wall members, four wall grooves are formed in a middle of said inner perimeter of said four wall sections to receive an opposing end of said four wall members, said four wall grooves of said base cylinder and said perimeter wall have a substantially vertical orientation.

14. The modular base for a tower with exterior cable support of claim 13 wherein:
said foundation base member includes two female base sections and two male base sections which interlock with each other.

15. The modular base for a tower with exterior cable support of claim 14 wherein:
a plurality of location pins extend upward from said two female base sections and said two male base sections.

16. The modular base for a tower with exterior cable support of claim 13 wherein:
said perimeter wall base includes four wall sections.

17. The modular base for a tower with exterior cable support of claim 13 wherein:
said perimeter wall base and said at least four wall members are secured to said foundation base member with a plurality of brackets and a plurality of fasteners.

* * * * *